US00RE50484E

(19) United States
(12) Reissued Patent
Lavigne et al.

(10) Patent Number: US RE50,484 E
(45) Date of Reissued Patent: Jul. 8, 2025

(54) SYSTEM AND METHOD FOR MANAGING WATER

(71) Applicant: Eagle View Technologies, Inc., Rochester, NY (US)

(72) Inventors: Kristin Lavigne, Lincoln, MA (US); David Murr, Minneapolis, MN (US); Lars P. Dyrud, Crownsville, MD (US); Jonathan T. Fentzke, Arlington, VA (US); Indra Epple, Somerville, MA (US); Shadrian Strong, Catonsville, MD (US)

(73) Assignee: Eagle View Technologies, Inc., Rochester, NY (US)

(21) Appl. No.: 15/998,604

(22) Filed: Aug. 16, 2018

Related U.S. Patent Documents

Reissue of:
(64) Patent No.: 9,418,290
Issued: Aug. 16, 2016
Appl. No.: 14/696,867
Filed: Apr. 27, 2015

U.S. Applications:
(60) Provisional application No. 62/091,040, filed on Dec. 12, 2014.

(51) Int. Cl.
*G06K 9/00* (2022.01)
*G06F 18/241* (2023.01)
(Continued)

(52) U.S. Cl.
CPC ..... *G06V 20/188* (2022.01); *G06F 18/241* (2023.01); *G06F 18/24323* (2023.01); *G06Q 50/26* (2013.01)

(58) Field of Classification Search
CPC ..... G06K 9/00657; G06K 9/6268; G06K 9/4676; G06K 9/6282; G06Q 50/00;
(Continued)

(56) References Cited

U.S. PATENT DOCUMENTS 5,053,778 A 10/1991 Imhoff
5,323,317 A 6/1994 Hampton et al.
(Continued)

FOREIGN PATENT DOCUMENTS

WO WO 2016/054694 4/2016

OTHER PUBLICATIONS

Bruzzone et al., "Detection of land-cover transitions by combining multidate classifiers", 2004, Science Direct—Pattern Recognition Letters, vol. 25, Issue 13, pp. 1491-1500 (Year: 2004).*
(Continued)

*Primary Examiner* — Adam L Basehoar
(74) *Attorney, Agent, or Firm* — DUNLAP CODDING, P.C.

(57) ABSTRACT

A device includes an image data receiving component, a vegetation index generation component, a GLC matrix component, a plurality of classifying components and a voting component. The image data receiving component receives multiband image data of a geographic region. The vegetation index generation component generates a normalized difference vegetation index based on the received multiband image data. The GLC matrix component generates a grey level co-occurrence matrix image band based on the received multiband image data. The classifying components generate land cover classifications based on the received multiband image data, the normalized difference vegetation index and the grey level co-occurrence matrix image band. The voting component generates a final land cover classification based a majority vote of the land cover classifications.

27 Claims, 10 Drawing Sheets

(51) Int. Cl.

| | |
|---|---|
| ***G06F 18/243*** | (2023.01) |
| ***G06K 9/46*** | (2006.01) |
| ***G06K 9/62*** | (2022.01) |
| ***G06V 20/10*** | (2022.01) |
| *G06Q 50/26* | (2012.01) |

(58) Field of Classification Search
CPC ..... G06Q 50/26; G06V 20/188; G06F 18/24323; G06F 18/241
See application file for complete search history.

(56) References Cited

U.S. PATENT DOCUMENTS

| | | | | |
|---|---|---|---|---|
| 5,793,888 | A | 8/1998 | Delanoy | |
| 5,963,880 | A * | 10/1999 | Smith | G06F 17/11 340/870.05 |
| 7,058,197 | B1 * | 6/2006 | McGuire | G06K 9/00657 382/100 |
| 7,386,170 | B2 * | 6/2008 | Ronk | G06F 17/30256 348/699 |
| 7,647,181 | B2 * | 1/2010 | Vaatveit | G06K 9/0063 434/150 |
| 7,729,533 | B2 * | 6/2010 | Sathyanarayana | G06K 9/6256 382/133 |
| 7,805,380 | B1 * | 9/2010 | Hornbeck | G06Q 30/08 705/315 |
| 8,001,115 | B2 * | 8/2011 | Davis | G06K 9/0063 382/181 |
| 8,095,434 | B1 | 1/2012 | Puttick et al. | |
| 8,243,997 | B2 * | 8/2012 | Davis | G06K 9/0063 382/109 |
| 8,250,481 | B2 * | 8/2012 | Klaric | G06K 9/0063 345/473 |
| 8,655,601 | B1 | 2/2014 | Sridhar et al. | |
| 9,141,872 | B2 * | 9/2015 | Marchisio | G06K 9/4647 |
| 9,147,132 | B2 * | 9/2015 | Marchisio | G06K 9/6269 |
| 9,202,252 | B1 * | 12/2015 | Smith | G06Q 50/02 |
| 9,258,952 | B2 * | 2/2016 | Walker | A01G 25/16 |
| 9,275,297 | B2 * | 3/2016 | Tabb | G06K 9/4633 |
| 9,418,290 | B2 | 8/2016 | Lavigne et al. | |
| 9,536,148 | B2 | 1/2017 | Gross | |
| 9,552,638 | B2 | 1/2017 | Lavigne et al. | |
| 9,875,430 | B1 * | 1/2018 | Keisler | G06K 9/6276 |
| 10,400,551 | B2 | 9/2019 | Murr et al. | |
| 2003/0088527 | A1 * | 5/2003 | Hung | H04Q 9/00 705/412 |
| 2007/0030998 | A1 * | 2/2007 | O'Hara | G06T 7/254 382/100 |
| 2007/0112695 | A1 * | 5/2007 | Wang | G06K 9/6282 706/2 |
| 2007/0116365 | A1 | 5/2007 | Kloer | |
| 2009/0271045 | A1 * | 10/2009 | Savelle, Jr. | A01G 25/167 700/284 |
| 2010/0223276 | A1 * | 9/2010 | Al-Shameri | G06K 9/0063 707/769 |
| 2012/0323798 | A1 | 12/2012 | Den Herder et al. | |
| 2013/0046746 | A1 | 2/2013 | Bennett | |
| 2013/0116994 | A1 * | 5/2013 | Abbott Donnelly | G06Q 50/06 703/6 |
| 2015/0027040 | A1 | 1/2015 | Redden | |
| 2015/0071528 | A1 * | 3/2015 | Marchisio | G06K 9/6269 382/159 |
| 2015/0294154 | A1 | 10/2015 | Sant et al. | |
| 2015/0347872 | A1 | 12/2015 | Taylor et al. | |
| 2015/0371115 | A1 * | 12/2015 | Marchisio | G06K 9/6269 382/159 |
| 2016/0088807 | A1 | 3/2016 | Bermudez Rodriguez et al. | |
| 2016/0239709 | A1 | 8/2016 | Shriver | |
| 2016/0253595 | A1 | 9/2016 | Mathur et al. | |
| 2017/0249496 | A1 | 8/2017 | Fentzke et al. | |
| 2017/0371897 | A1 | 12/2017 | Strong et al. | |
| 2018/0293671 | A1 | 10/2018 | Murr et al. | |

OTHER PUBLICATIONS

Marceau et al., "Evaluation of the Grey-Level Co-Occurrence Matrix Method For Land-Cover Classification Using Spot Imagery", 1990, IEEE—Transactions on Geoscience and Remote Sensing, vol. 28, No. 4, pp. 513-519 (Year: 1990).*

Lorenzo Bruzzone and Roberto Cossu, "A Multiple-Cascade-Classifier System for a Robust and Partially Unsupervised Updating of Land-Cover Maps", IEEE Transactions On Geoscience and Remote Sensing, vol. 40, No. 9, pp. 1984-1996 (Year: 2002).*

"OmniParcels for Insurance", PowerPoint Presentation, OmniEarth, Inc., Mar. 25, 2016.

Kittler, et al.; On Combining Classifiers; IEEE Transactions on Pattern Analysis and Machine Intelligence; Mar. 1998; 226-240; vol. 20, IEEE Computer Society.

"OmniParcels/Yardographics/Water Resources", OmniEarth, Inc., retrieved from the internet: https://parceldemo.omniearth.net/#/map/, Feb. 2016.

"OmniParcels Delivers Current, Searchable Property Attributes with Regular Updates", via Internet Archive Wayback Machine [retrieved from the internet Jul. 25, 2017] retrieved from: https://web.archive.org/web/20160305114343/http://omniparcels.omniearth.net/, Mar. 5, 2016.

Goldberg et al., "Extracting geographic features from the Internet to automatically build detailed regional gazetteers," International Journal of Geographical Information Science, 23:1, 93-128, Jan. 2009.

Harris Geospatial Solutions, "Using ENVI and Geographic Information Systems (GIS)", Jan. 31, 2013.

Commonwealth of Massachusetts Executive Office of Environmental Affairs, "Parcel Mapping Using GIS a Guide to Digital Parcel Map Development for Massachusetts Local Governments", Aug. 1999.

European Court of Auditors, "The Land Parcel Identification System: a useful tool to determine the eligibility of agricultural land—but its management could be further improved", Luxembourg, 2016.

Krizhevsky et al., "ImageNet Classification with Deep Convolutional Neural Networks", Advances in Neural Information Processing Systems 25, pp. 1097-1105, Curran Associates, Inc., 2012.

Mountrakis et al., "Support vector machines in remote sensing: A review," ISPRS Journal of Photogrammetry and Remote Sensing vol. 66, Issue 3, May 2011, pp. 247-259.

Brockwell et al., "Introduction to Time Series and Forecasting," 2nd Edition, Springer, 2002, Chapters 3 and 5.

Ogata, "Modern Control Engineering," 5th Edition, Prentice-Hall, 2009, Chapter 1.3.

Montgomery et al., "Introduction to Linear Regression Analysis," 5th Edition, Wiley, 2012, Chapter 2.

* cited by examiner

SYSTEM AND METHOD FOR MANAGING WATER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

The present application *is a reissue of U.S. Pat. No. 9,418,290 which issued on Aug. 16, 2016, from U.S. patent application Ser. No. 14/696,867, filed on Apr. 27, 2015, which* claims priority from: U.S. Provisional Application No. 62/091,040 filed Dec. 12, 2014, the entire disclosure of which is incorporated herein by reference.

BACKGROUND

The present invention generally deals with systems and method of managing water.

With states across the country dealing with unprecedented levels of drought, water utilities are scrambling to find effective ways to analyze water usage within their districts and target their conservation efforts. In order to do this, they need to create an accurate water budget that shows them how much water each land parcel in their water district needs given the evapotranspiration (ET) rates of its land cover composition. An evapotranspiration rate is the sum of evaporation and plant transpiration from the Earth's land and ocean surface to the atmosphere. Evaporation accounts for the movement of water to the air from sources such as the soil, canopy interception, and waterbodies.

This information, combined with actual customer water use data, provides the water district with information on where to target water conservation marketing efforts. Without technology, this process must be done by manually surveying each parcel, which is a costly, time consuming, and error-prone process.

A conventional solution has three main stages: water budget calculation, result display, and comparison between the water budget and the customer water use data.

Satellite imagery is conventionally used to determine the square footage of each parcel by land cover type, e.g., trees, grass, natural water body, man-made surface, man-made water body, etc. The final water budget will be calculated by multiplying the area of each parcel's land cover type by the associated ET rate and combining these products. These calculations essentially show how much of each land cover type is present on each parcel (i.e., blacktop, grass, swimming pool, etc.) and therefore how much water each parcel should need. For example, trees may have a higher ET rate than a blacktop, so a parcel of land of trees will need more water than a parcel of land of blacktop.

A parcel's water budget is then compared with the actual water use taken from customer water meter data. Parcels with large discrepancies indicate abnormal water use that can be targeted for further outreach and investigation. This solution uses satellite imagery, geo-located parcel data, customer water use data, and an external source for ET rates.

A conventional system and method for managing water will now be described with reference to FIGS. 1-6.

FIG. 1 illustrates a conventional system 100 for managing water.

As shown in the figure, system 100 includes resource managing component 102 and a network 104. Resource managing component 102 includes a database 106, a controlling component 108, an accessing component 110, a communication component 112, a vegetation index component 114, a classification component 116, a zonal statistics component 118, a water budget component 120 and a delta component 122.

In this example, database 106, controlling component 108, accessing component 110, communication component 112, vegetation index component 114, classification component 116, zonal statistics component 118, water budget component 120 and delta component 122 are illustrated as individual devices. However, in some embodiments, at least two of database 106, controlling component 108, accessing component 110, communication component 112, vegetation index component 114, classification component 116, zonal statistics component 118, water budget component 120 and delta component 122 may be combined as a unitary device. Further, in some embodiments, at least one of database 106, controlling component 108, accessing component 110, communication component 112, vegetation index component 114, classification component 116, zonal statistics component 118, water budget component 120 and delta component 122 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Controlling component 108 is in communication with each of accessing component 110, communication component 112, vegetation index component 114, classification component 116, zonal statistics component 118, water budget component 120 and delta component 122 by communication channels (not shown). Controlling component 108 may be any device or system that is able to control operation of each of accessing component 110, communication component 112, vegetation index component 114, classification component 116, zonal statistics component 118, water budget component 120 and delta component 122.

Accessing component 110 is arranged to bi-directionally communicate with database 106 via a communication channel 124 and is arranged to bi-directionally communicate with communication component 112 via a communication channel 126. Accessing component 110 is additionally arranged to communicate with vegetation index component 114 via a communication channel 128, to communicate with classification component 116 via a communication channel 130, to communicate with zonal statistics component 118 via a communication channel 132, to communicate with water budget component 120 via a communication channel 134 and to communicate with delta component 122 via a communication channel 136. Accessing component 110 may be any device or system that is able to access data within database 106 directly via communication channel 124 or indirectly, via communication channel 126, communication component 112, communication channel 138, network 104 and communication channel 140.

Communication component 112 is additionally arranged to bi-directionally communicate with network 104 via a communication channel 138. Communication component 112 may be any device or system that is able to bi-directionally communicate with network 104 via communication channel 138.

Network 104 is additionally arranged to bi-directionally communicate with database 106 via a communication channel 140. Network 104 may be any of known various communication networks, non-limiting examples of which include a Local Area Network (LAN), a Wide Area Network (WAN), a wireless network and combinations thereof. Such networks may support telephony services for a mobile terminal to communicate over a telephony network (e.g., Public Switched Telephone Network (PSTN). Non-limiting example wireless networks include a radio network that supports a number of wireless terminals, which may be fixed or mobile, using various radio access technologies. According to some example embodiments, radio technologies that can be contemplated include: first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), 4G, etc. For instance, various mobile communication standards have been introduced, such as first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), and beyond [30] *3G* technologies (e.g., third generation partnership project (3GPP) long term evolution (3GPP LTE), 3GPP2 universal mobile broadband (3GPP2 UMB), etc.).

Complementing the evolution in mobile communication standards adoption, other radio access technologies have also been developed by various professional bodies, such as the Institute of Electrical and Electronic Engineers (IEEE), for the support of various applications, services, and deployment scenarios. For example, the IEEE 802.11 standard, also known as wireless fidelity (WiFi), has been introduced for wireless local area networking, while the IEEE 802.16 standard, also known as worldwide interoperability for microwave access (WiMAX) has been introduced for the provision of wireless communications on point-to-point links, as well as for full mobile access over longer distances. Other examples include Bluetooth™, ultra-wideband (UWB), the IEEE 802.22 standard, etc.

Vegetation index component 114 is additionally arranged to communicate with classification component 116 via a communication channel 142. Vegetation index component 114 may be any device or system that is able to generate a vegetation index, or a normalized difference vegetation index (NDVI). An NDVI is a simple graphical indicator that can be used to analyze remote sensing measurements, typically not necessarily form a space platform, and assess whether the target being observed contains live green vegetation or not. In an example embodiment, a normalized difference vegetation index is generated using the following equation:

$$(\nu_{NIR}-\nu_R)/(\nu_{NIR}+\nu_R), \tag{1}$$

where $\nu_{NIR}$ is the near infrared band and where $\nu_R$ is the red band.

Classification component 116 is additionally arranged to communicate with zonal statistics component 118 via a communication channel 144. Classification component 116 may be any device or system that is able to classify each pixel, or group of pixels, of an image as one of the group of predefined land cover classes. In some non-limiting examples, classification component 116 is able to classify each pixel as one of the group consisting of grass, a tree, a shrub, a man-made surface, a man-made pool, a natural water body and artificial turf.

Zonal statistics component 118 is additionally arranged to communicate with water budget component 120 via a communication channel 146. Zonal statistics component 118 may be any device or system that is able to generate a land cover classification per parcel of land. For example, zonal statistics component 118 may determine that a specific county, as the parcel of land, has 38% tree cover, 18% shrub cover, 16% blacktop cover, 12% grass cover, 8% natural water cover and 8% man-made structure cover based on the classification of the pixels of the image within the county as defined by the parcel data. In some embodiments, zonal statistics component 11 may determine the percentages of cover by dividing the number of pixels of the image within the parcel by the number of pixels of a particular type of classification (cover).

Water budget component 120 is additionally arranged to communicate with delta component 122 via a communication channel 148. Water budget component 120 may be any device or system that is able to calculate a water budget per parcel of land in view of the evapotranspiration rates for the parcel of land. For example, water budget component 118 may determine the water budget of the county discussed above (having 38% tree cover, 18% shrub cover, 16% blacktop cover, 12% grass cover, 8% natural water cover and 8% man-made structure cover) based on the ET rates of trees, shrubs, blacktop, grass, natural water and man-made structures.

Delta component 122 is additionally arranged to communicate with communication component 112 via a communication channel 150. Delta component 122 may be any device or system that is able to generate a difference of an amount of water, Δ, by comparing the water budget with the water meter readings within the parcel of land. For example, delta component 122 may determine Δ of a parcel of land based on the following:

$$\Delta=w_m-\Sigma ET, \tag{2}$$

where $w_m$ is the total amount of metered water in the parcel of land, ET is the ET rate of a pixel within the parcel of land.

Communication channels 124, 126, 128, 130, 132, 134, 136, 138, 140, 142, 144, 146, 148 and 150 may be any known wired or wireless communication channel.

Operation of system 100 will now be described with reference to FIGS. 2-6.

FIG. 2 illustrates a conventional method 200 of managing water.

As shown in the figure, method 200 starts (S202) and image data is received (S204). For example, as shown in FIG. 1, accessing component 110 retrieves image data from database 106. In some embodiments, accessing component 110 may retrieve the image data directly from database 106 via communication channel 124. In other embodiments, accessing component 110 may retrieve the image data from database 106 via a path of communication channel 124, communication component 112, communication channel 138, network 104 and communication channel 140.

Database 106 may have various types of data stored therein. This will be further described with reference to FIG. 3.

FIG. 3 illustrates an example of database 106 of FIG. 1.

As shown in FIG. 3, database 106 includes an image data database 302, a training data database 304, a parcel data database 306, an evapotranspiration ("ET") rates database 308 and a water meter database 310.

In this example, image data database 302, training data database 304, parcel data database 306, ET rates database 308 and water meter database 310 are illustrated as individual devices. However, in some embodiments, at least two of image data database 302, training data database 304, parcel data database 306, ET rates database 308 and water meter database 310 may be combined as a unitary device. Further, in some embodiments, at least one of image data database 302, training data database 304, parcel data database 306, ET rates database 308 and water meter database 310 may be implemented as a computer having tangible computer-readable media for carrying or having computer-executable instructions or data structures stored thereon.

Image data database 302 includes image data corresponding to an area of land for which water is to be managed. The image data may be provided via a satellite imaging platform. The image data may include a single band or multi-band image data, wherein the image (of the same area of land for which water is to be managed) is imaged in a more than one frequency. In some embodiments, image data may include 4-band image data, which include red, green, blue and near infrared bands (RGB-NIR) of the same area of land for which water is to be managed. In other embodiments, the image data may include more than 4 bands, e.g., hyperspectral image data. The image data comprises pixels, each of which includes respective data values for frequency (color) and intensity (brightness). The frequency may include a plurality of frequencies, based on the number of bands used in the image data. Further, there may be a respective intensity value for each frequency value.

Training data database 304 includes training data to train a classification component to distinctly classify an image pixel. For example, training data for a 4-band image may include specific 4-band pixels data values associated with each land cover classification. In other words, there may be training data for a pixel associated with an image of a tree and different training data for a pixel associated with a man-made surface such as blacktop.

Parcel data database 306 includes geographically divided portions of the land. This may be provided by government agencies or public utilities. Non-limiting examples of geographically divided portions include country, state, county, township, city or individual land owner borders.

ET rates database 308 includes ET rates for regions. These ET rates may be provided by government agencies or public utilities.

Water meter data database 310 includes water meter readings as provided by government agencies or public utilities.

Returning to FIG. 1, in some cases, database 106 is included in resource managing component 102. However, in other cases, database 106 is separated from resource managing component 102, as indicated by dotted rectangle 110.

As accessing component 110 will be accessing many types of data from database 106, accessing component 110 includes many data managing components. This will be described with greater detail with reference to FIG. 4.

FIG. 4 illustrates an example of accessing component 110 of FIG. 1.

As shown in FIG. 4, accessing component 110 includes a communication component 402, an image data receiving component 404, a training data receiving component 406, a parcel data receiving component 408, an ET rates data receiving component 410 and a water meter data receiving component 412.

In this example, communication component 402, image data receiving component 404, training data receiving component 406, parcel data receiving component 408, ET rates data receiving component 410 and water meter data receiving component 412 are illustrated as individual devices. However, in some embodiments, at least two of communication component 402, image data receiving component 404, training data receiving component 406, parcel data receiving component 408, ET rates data receiving component 410 and water meter data receiving component 412 may be combined as a unitary device. Further, in some embodiments, at least one of communication component 402, image data receiving component 404, training data receiving component 406, parcel data receiving component 408, ET rates data receiving component 410 and water meter data receiving component 412 may be implemented as a computer having tangible computer-readable media for carrying or having computer-executable instructions or data structures stored thereon.

Communication component 402 is arranged to bi-directionally communicate with database 106 via a communication channel 124 and is arranged to bi-directionally communicate with communication component 112 via a communication channel 126.

Communication component 402 is additionally arranged to directionally communicate with image data component 404 via a communication channel 414, to communicate with training data component 406 via a communication channel 416, to communicate with parcel data component 408 via a communication channel 418, to communicate with ET rates data component 410 via a communication channel 420 and to communicate with water meter data component 412 via a communication channel 422. Communication component 402 may be any device or system that is able to access data within database 106 directly via communication channel 124 or indirectly, via communication channel 126, communication component 112, communication channel 138, network 104 and communication channel 140. Image data component 404, training data component 406, parcel data component 408, ET rates data component 410 and water meter data component 412 may each be any device or system that is able to receive data from communication component 402 and to output the received data.

Image data component 402 is additionally arranged to communicate with vegetation index component 114 via communication channel 128. Training data component 406 is additionally arranged to communicate with classification component 116 via communication channel 130. Parcel data component 408 is additionally arranged to communicate with zonal statistics component 118 via communication channel 132. ET rates data component 410 is additionally arranged to communicate with water budget component 120 via communication channel 134. Water meter data component 412 is additionally arranged to communicate with delta component 122 via communication channel 136. Communication channels 414, 416, 418, 420 and 422 may be any known wired or wireless communication channel.

Returning to FIG. 1, at this point accessing component 110 has received the image data. An example of such image data will now be described with reference to FIG. 5.

FIG. 5 illustrates a satellite image 500 of a plot of land. As shown in the figure, satellite image 500 includes a grass 502, trees 504, man-made surfaces—including building 506 and road 508, and a man-made pool 510.

As for a broad view of method 200, system 100 will be able to determine the amount of water that is received within the area of land within satellite image 500, to determine, with the ET rate of water within the area of land within satellite image 500, the amount of water used (by residents for example) within the area of land within satellite image 500 and to determine a surplus or deficit (Δ) of water within the area of land within satellite image 500.

This will now be continued by returning to FIG. 2.

After the image data is received (S204), a vegetation index is generated (S206). For example, as shown in FIG. 1, accessing component 110 provides the received image data to vegetation index component 114 via communication channel 128. For example, as shown in FIG. 1 accessing component 110 retrieves image data from database 106. As shown in FIG. 3, database 106 provides the image data from image data database 302. As shown in FIG. 4, communication component 402 receives the image data from image data database 302 and provides the image data to image data receiving component 404 via communication channel 414. Returning to FIG. 1, image data receiving component 404 (of accessing component 110) then provides the image data to vegetation index component 114 via communication channel 128.

Vegetation index component 114 generates a NDVI vegetation index for the image data and provides the vegetation index to classification component 116 via communication channel 142.

Returning to FIG. 2, after the vegetation index is generated (S206), classification results are generated (S208). For example, as shown in FIG. 1, accessing component 110 provides the received image data additionally to classification component 116 via communication channel 130. Further, vegetation index component 114 provides the vegetation index to classification component 116 via communication line 142. With the image data from accessing component 110 and with the vegetation index from vegetation index component, classification component 116 classifies each pixel of data as one of many predetermined classes.

For example, returning to FIG. 5, a pixel within image 500 at the location of trees 504 will have colors (frequencies) and intensities indicative of trees. As such, classification component will use information from the vegetation index in addition to the image data for that pixel to classify the pixel as a tree. Similarly, a pixel within image 500 at the location of road 508 will have colors (frequencies) and intensities indicative of a road. As such, classification component will use information from the vegetation index in addition to the image data for that pixel to classify the pixel as a road. This classification continues for each pixel within image 500.

Returning to FIG. 2, after the classification results are generated (S208), training data is received (S210). For example, as shown in FIG. 1 accessing component 110 retrieves training data from database 106. As shown in FIG. 3, database 106 provides the training data from training data database 304. As shown in FIG. 4, communication component 402 receives the training data from training data database 304 and provides the training data to training data receiving component 406 via communication channel 416. Returning to FIG. 1, training data receiving component 406 (of accessing component 110) then provides the training data to classification component 116 via communication channel 130.

It should be noted that in the example discussed above, generating the classification results (S208) is prior to receiving training data (S210). However, in some embodiments, generating the classification results (S208) may occur after receiving training data (S210). Further, in some embodiments, generating the classification results (S208) may occur concurrently with receiving training data (S210).

Returning to FIG. 2, after the training data is received (S210), a final classification is generated (S212). For example, every pixel within the entire image 500 of FIG. 5 will have been classified. This will be described with reference to FIG. 6.

FIG. 6 illustrates a classified image 600 of the plot of land within satellite image 500 of FIG. 5.

As shown in FIG. 6, classified image 600 includes an area 602, an area 604, an area 606, an area 608 and an area 610. Area 602 corresponds to grass 502 of satellite image 500 of FIG. 5. Area 604 corresponds to trees 504 of satellite image 500 of FIG. 5. Area 606 corresponds to building 506 of satellite image 500 of FIG. 5. Area 608 corresponds to road 508 of satellite image 500 of FIG. 5. Area 610 corresponds to man-made pool 510 of satellite image 500 of FIG. 5.

Returning to FIG. 2, after the final classification is generated (S212), parcel data is received (S214). For example, as shown in FIG. 1, accessing component 110 provides the parcel data to zonal statistics component 118 via communication channel 132. For example, as shown in FIG. 1 accessing component 110 retrieves parcel data from database 106. As shown in FIG. 3, database 106 provides the parcel data from parcel data database 306. As shown in FIG. 4, communication component 402 receives the parcel data from parcel data database 306 and provides the parcel data to parcel data receiving component 408 via communication channel 418. Returning to FIG. 1, parcel data receiving component 408 (of accessing component 110) then provides the parcel data to zonal statistics component 118 via communication channel 132.

At this point, the boundaries of land are known by way of the parcel data. These boundaries may include country boundaries, state boundaries, county boundaries, city/town boundaries and boundaries of individually owned parcels of land. These boundaries may be provided by government entities and/or private entities. Zonal statistics component 118 may use the boundaries as identified in the parcel data to establish the land cover per parcel of land.

Returning to FIG. 2, after the parcel data is received (S214) and the land cover has been classified per parcel of land, the land cover by parcel is generated (S216). For example, as shown in FIG. 1

Zonal statistics component 118 then generates the land cover classification per parcel of land. For example, if the image data were to include the image of an entire state, zonal statistics component 118 may be able to generate the land cover classification per county, per town, or even per parcel of land by organizing the land cover classification per county, per town, etc. More particularly, polygons are drawn around each land cover type. The end result is a vector layer of land cover polygons that are then used to calculate area. Zonal statistics is not often used, but is used in more general remote sensing applications. The biggest difference is that zonal statistics are derived directly from the imagery. On the other hand, land cover calculation using vector layers has an intermediary step of transforming the image into a vector layer for each land cover type, and then the area for each vector layer is calculated within the parcel.

Returning to FIG. 2, after the land cover by parcel is generated (S216), the ET rates are received (S218). For example, as shown in FIG. 1, accessing component 110 provides the ET rates data to water budget component 120 via communication channel 134. For example, as shown in FIG. 1 accessing component 110 retrieves ET rates data from database 106. As shown in FIG. 3, database 106 provides the ET rates data from ET rates data database 308. As shown in FIG. 4, communication component 402 receives the ET rates data from ET rates data database 308 and provides the ET rates data to ET rates data receiving component 410 via communication channel 420. Returning to FIG. 1, ET rates data receiving component 410 (of accessing component 110) then provides the ET rates data to water budget component 120 via communication channel 134.

Returning to FIG. 2, after the ET rates are received (S218), the water budget per parcel is generated (S220). For example, as shown in FIG. 1, water budget component 120 determines a water budget per parcel in light of the ET rate of the respective parcel. For example, for purposes of discussion, let the plot of land within image 500 of FIG. 5 be a delineated parcel of land.

At this point of method 200, land cover of the parcel of land within image 500 has been determined. As shown in FIG. 1, zonal statistics component 118 provides the land cover of the parcel of land to water budget component 120 via communication channel 146. Further, the ET rates are known from ET rates database 308. As such, the ET rates of the plot of land within image 500 of FIG. 5 may be determined.

A water budget may be determined with a pre-determined upper threshold of retained water and a predetermined lower threshold of retained water. The retained water is determined by subtracting the amount of evaporated water, as determined from the evapotranspiration rate, from the amount of received water.

Returning to FIG. 2, after water budget per parcel is generated (S220), the water meter readings are received (S222). For example, as shown in FIG. 1, accessing component 110 provides the water meter data to delta component 122 via communication channel 136. For example, as shown in FIG. 1 accessing component 110 retrieves water meter data from database 106. As shown in FIG. 3, database 106 provides the water meter data from water meter data database 310. As shown in FIG. 4, communication component 402 receives the water meter data from water meter data database 310 and provides the water meter data to water meter data receiving component 412 via communication channel 422. Returning to FIG. 1, water meter data receiving component 412 (of accessing component 110) then provides the water meter data to delta component 122 via communication channel 136.

The water meter readings indicate the amount of metered water used in the parcel. For example, in a county, the sum water meter readings of the individual property owners will provide an accurate estimate of the amount of water used and disposed of by the county.

Returning to FIG. 2, after water meter readings are received (S222), the Δ is generated (S224). For example, as shown in FIG. 1, delta component 122 determines a water surplus or water deficit per parcel of land. Water budget component 120 provides the water budget per parcel to delta component 122 via communication line 148. Further, as noted above, accessing component 110 provides the ET rates to delta component via communication channel 136.

The amount of water retained by the land will include the precipitation within the parcel of land minus the metered water, minus the evaporated water, wherein the evaporated water is determined by the ET rate. Typically, it is a goal to maintain a constant amount of retained water, wherein the amount of precipitation is equal to the amount of metered water and evaporated water. In this light, a water budget is based on the amount of precipitation—the amount of water received, and the amount of evaporated water—derived from the ET rates. If the amount of water received is less than the combined amount of metered water and the amount of evaporated water, then the parcel of land will have a water deficit, wherein the Δ for the parcel of land will be negative. If the amount of water received is more than the combined amount of metered water and the amount of evaporated water, then the parcel of land will have a water surplus deficit, wherein the Δ for the parcel of land will be positive.

Returning to FIG. 2, after the Δ is generated (S224), method 200 stops (S226).

A problem with the conventional system discussed above is that classification component 116 may inaccurately classify some pixels because the classification is based solely on the vegetation index. There may be circumstances that non-vegetation has a similar image to vegetation. In such cases, the non-vegetation as imaged by the satellite platform may have a similar vegetation index generated by vegetation index component 114. Therefore, the non-vegetation would incorrectly be classified as vegetation by classification component 116. This would ultimately lead to an incorrect land cover, an incorrect water budget and an incorrect Δ.

Another problem with the conventional system discussed above is there are many available individual classification methods that may be employed classification component 116, wherein each classification method has its strengths and weaknesses. Accordingly, there is no perfect classification method for all images. Therefore, in some cases, many pixels of the image may incorrectly be classified by classification component 116, again which would ultimately lead to an incorrect land cover, an incorrect water budget and an incorrect Δ.

Accordingly, for at least the foregoing reasons there exists a need to provide an improved method and apparatus of managing water.

SUMMARY

The present invention provides an improved method and apparatus of managing water.

Various embodiments described herein are drawn to a device that includes an image data receiving component, a vegetation index generation component, a GLC matrix component, a plurality of classifying components and a voting component. The image data receiving component receives multiband image data of a geographic region. The vegetation index generation component generates a normalized difference vegetation index based on the received multiband image data. The GLC matrix component generates a grey level co-occurrence matrix image band based on the received multiband image data. The classifying components generate land cover classifications based on the received multiband image data, the normalized difference vegetation index and the grey level co-occurrence matrix image band. The voting component generates a final land cover classification based a majority vote of the land cover classifications.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Aspects of the present invention are drawn to a system and method for managing water.

A first aspect of the present invention is drawn to using a grey level co-occurrence matrix (GLCM) to additionally help identify pixels in an image. A classification component in accordance with aspects of the present invention is able to classify each pixel of an image in view of the vegetation index in combination with results from the GLCM. The additional information provided by the GLCM reduces the likelihood that a pixel will be incorrectly classified.

Another aspect of the present invention is drawn to using a plurality of classification components to classify each pixel and then determining the final land cover classification based on a majority vote of the plurality of classifications for each pixel. Is should be noted that, in some embodiments, this is on a class by class basis, not on the whole image. In some embodiments, the image is broken up into different class images and is then reassembled.

As mentioned above, there are many classification methods, each with its own respective strengths and weaknesses. In accordance with aspects of the present invention, a pixel of an image may be classified by at least three classification components. If one of the three resulting classifications is different from the other two, it is ignored. In other words the majority of the two similar classifications of the pixel will increase the likelihood that the pixel will be classified correctly.

Another aspect of the present invention is drawn to a regression technique to generate a water use forecast.

Aspects of the present invention will now be described with reference to FIGS. 7-10.

Figure 7:
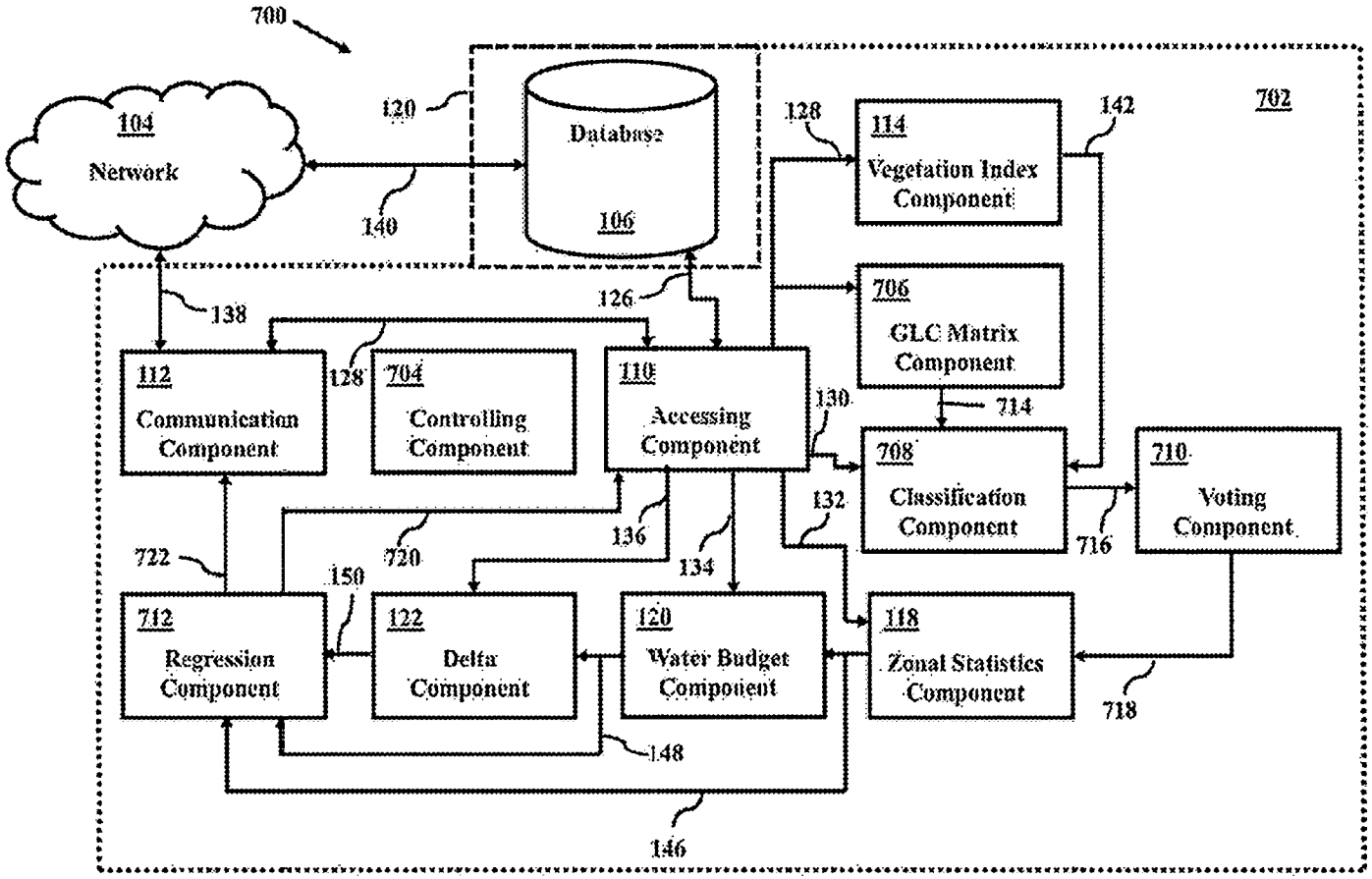
FIG. 7 illustrates an example system for managing water in accordance with aspects of the present invention.

FIG. 7 illustrates an example system 700 for managing water in accordance with aspects of the present invention.

Figure 1:
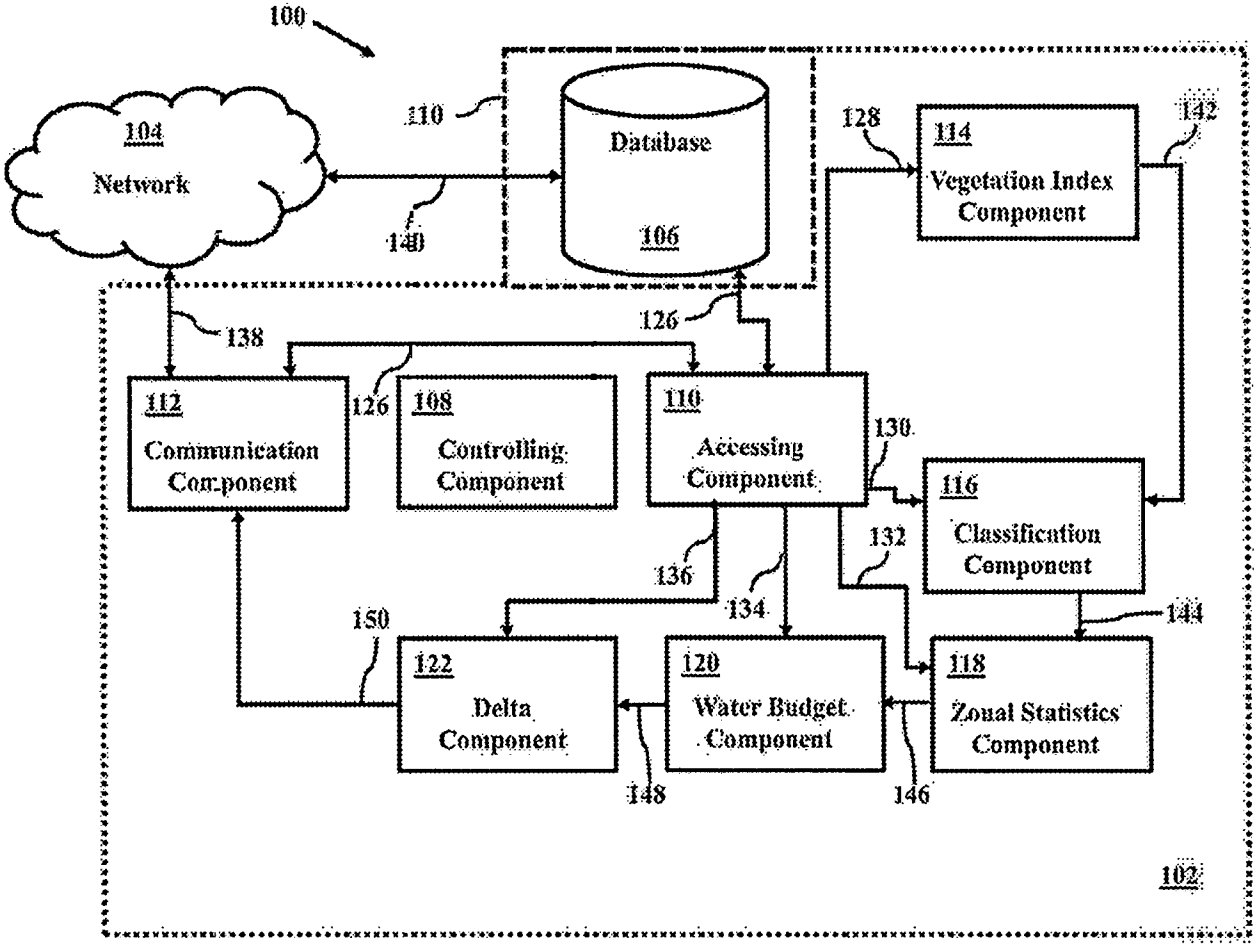
FIG. 1 illustrates a conventional system for managing water.

As shown in the figure, system 700 includes many components of system 100 of FIG. 1 discussed above. However, system 700 additionally includes a GLC matrix component 706, a voting component 710 and a regression component 712. Further system 700 replaces controlling component 108 of system 100 of FIG. 1 with a controlling component 704 and replaces classification component 116 of system 100 of FIG. 1 with a classification component 708.

In this example, database 106, controlling component 704, accessing component 110, communication component 112, vegetation index component 114, a classification component 708, zonal statistics component 118, water budget component 120, delta component 122, GLC matrix component 706, voting component 710 and regression component 712 are illustrated as individual devices. However, in some embodiments, at least two of database 106, controlling component 704, accessing component 110, communication component 112, vegetation index component 114, classification component 708, zonal statistics component 118, water budget component 120, delta component 122, GLC matrix component 706, voting component 710 and regression component 712 may be combined as a unitary device. Further, in some embodiments, at least one of database 106, controlling component 704, accessing component 110, communication component 112, vegetation index component 114, classification component 708, zonal statistics component 118, water budget component 120, delta component 122, GLC matrix component 706, voting component 710 and regression component 712 may be implemented as a computer having tangible computer-readable media for carrying or having computer-executable instructions or data structures stored thereon.

Accessing component 110 is additionally arranged to communicate with GLC matrix component 706 via communication channel 128 and to communicate with classification component 708 via communication channel 130.

Vegetation index component 114 is additionally arranged to communicate with classification component 708 via communication channel 142.

GLC matrix component 706 is additionally arranged to communicate with classification component 708 via a communication channel 714. Regression component 124 may be any device or system that is able to generate a GLC matrix image band. GLC matrix component 706 provides a series of "second order" texture calculations, and considers the relationship between groups of two pixels in the original image to generate a GLC matrix image band. GLC matrix component 706 considers the relation between two pixels at a time, called the reference and the neighbor pixel. Each pixel is the reference pixel at some point in the calculation. The result of this process is a plurality of measures for each pixel that indicates a type of relationship between that pixel and its neighbors, and most measures are weighted averages of the normalized GLC matrix cell contents.

In an example embodiment, GLC matrix component 706 provides 17 measures for each pixel. These measures are split into three categories: contrast, orderliness and statistics. The contrast group includes a contrast band, a dissimilarity band, a homogeneity band and an inertia band. The orderliness group includes an angular second moment (ASM) with energy band—also called "uniformity band," a maximum probability (MAX) band, an entropy (ENT) band, a sum of entropy (SENT) band and a difference of entropy (DENT) band. The statistics group includes an average (MEAN) band, a variance (VAR) band—also known as the "sum of squares variance" band, a correlation (CORR) band, a maximum correlation coefficient (MaxCORR) band, an information measures of correlation 1 (imcorr1) band, an information measures of correlation 2 (imcorr2) band, a sum of average (SAVG) band, an sum of variance (SVAR) band and a difference of variance (DVAR) band. In an example embodiment, out of the 18 bands, three are used, one for each category.

Classification component 708 is additionally arranged to communicate with voting component 710 via a communication channel 716, as compared with being able to communicate with zonal statistics component 118 as shown in system 100 of FIG. 1. Classification component 708 may be any device or system that is able to generate a plurality of land cover classifications based on the received multiband image data, the normalized difference vegetation index and the grey level co-occurrence matrix image band.

Voting component 710 is additionally arranged to communicate with zonal statistics component 118 via a communication channel 718. Voting component 710 may be any device or system that is able to generate a final land cover classification based a majority vote of the land cover classifications generated by classification component 708.

Delta component 122 is additionally arranged to communicate with regression component 712 via communication channel 150.

Regression component 712 is additionally arranged to communicate with accessing component 110 via communication channel 720 and with communication component 112 via communication channel 722. Regression component 712 may be any device or system that is able to generate a water use forecast based on the land cover classification per parcel of land, the water budget and the Δ. Regression component 712 uses a history of water usage to extrapolate a predicted water usage. Regression component 712 uses the land cover classification per parcel, the water budget per parcel and the Δ to generate a water use forecast for each parcel.

Controlling component 704 is in communication with each of accessing component 110, communication component 112, vegetation index component 114, GLC matrix component 706, classification component 708, voting component 710, zonal statistics component 118, water budget component 120, delta component 122 and regression component 712 by communication channels (not shown). Controlling component 704 may be any device or system that is able to control operation of each of accessing component 110, communication component 112, vegetation index component 114, GLC matrix component 706, classification component 708, voting component 710, zonal statistics component 118, water budget component 120, delta component 122 and regression component 712.

Communication channels 714, 716 and 718 may be any known wired or wireless communication channel.

Operation of system 700 will now be described with reference to FIGS. 8-9.

Figure 8:
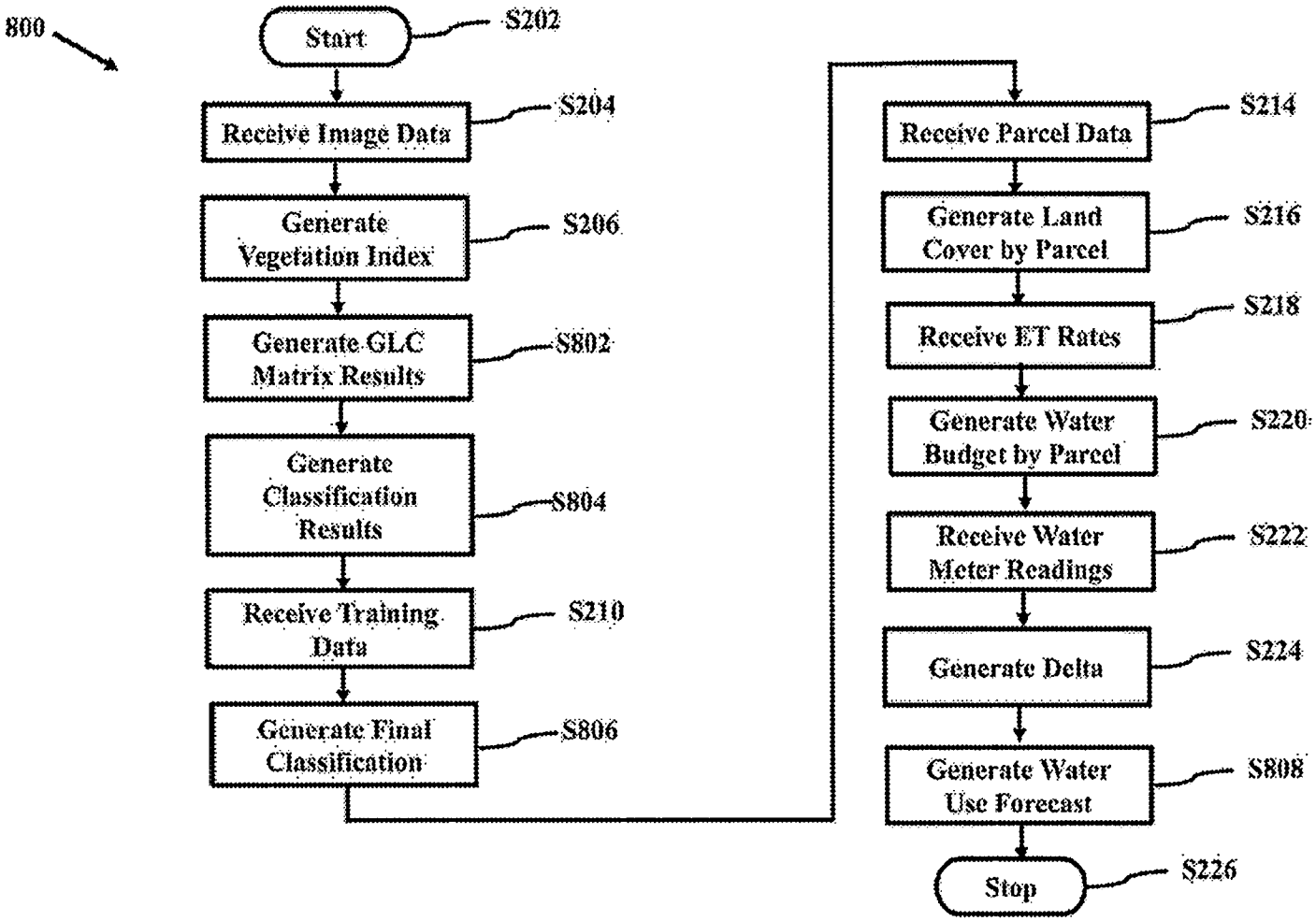
FIG. 8 illustrates a method of managing water in accordance with aspects of the present invention.

FIG. 8 illustrates a method 800 of managing water in accordance with aspects of the present invention.

Figure 2:
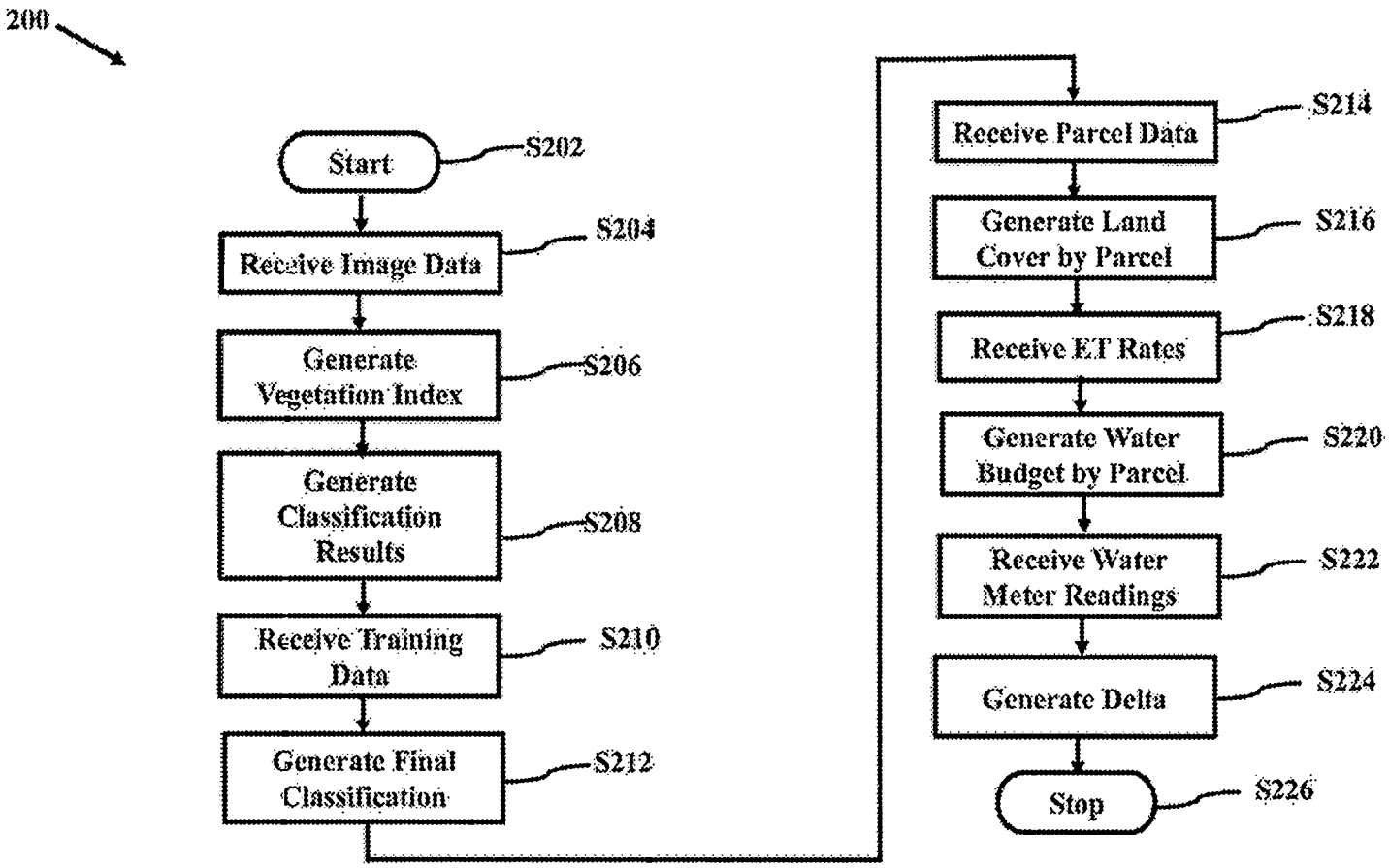
FIG. 2 illustrates a conventional method of managing water.
Figure 3:
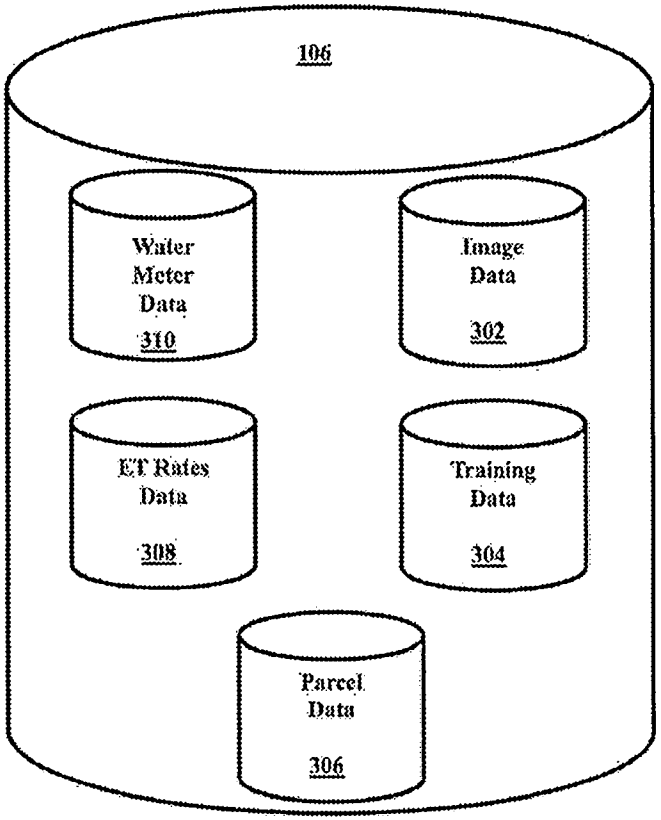
FIG. 3 illustrates an example of the database of FIG. 1.
Figure 4:
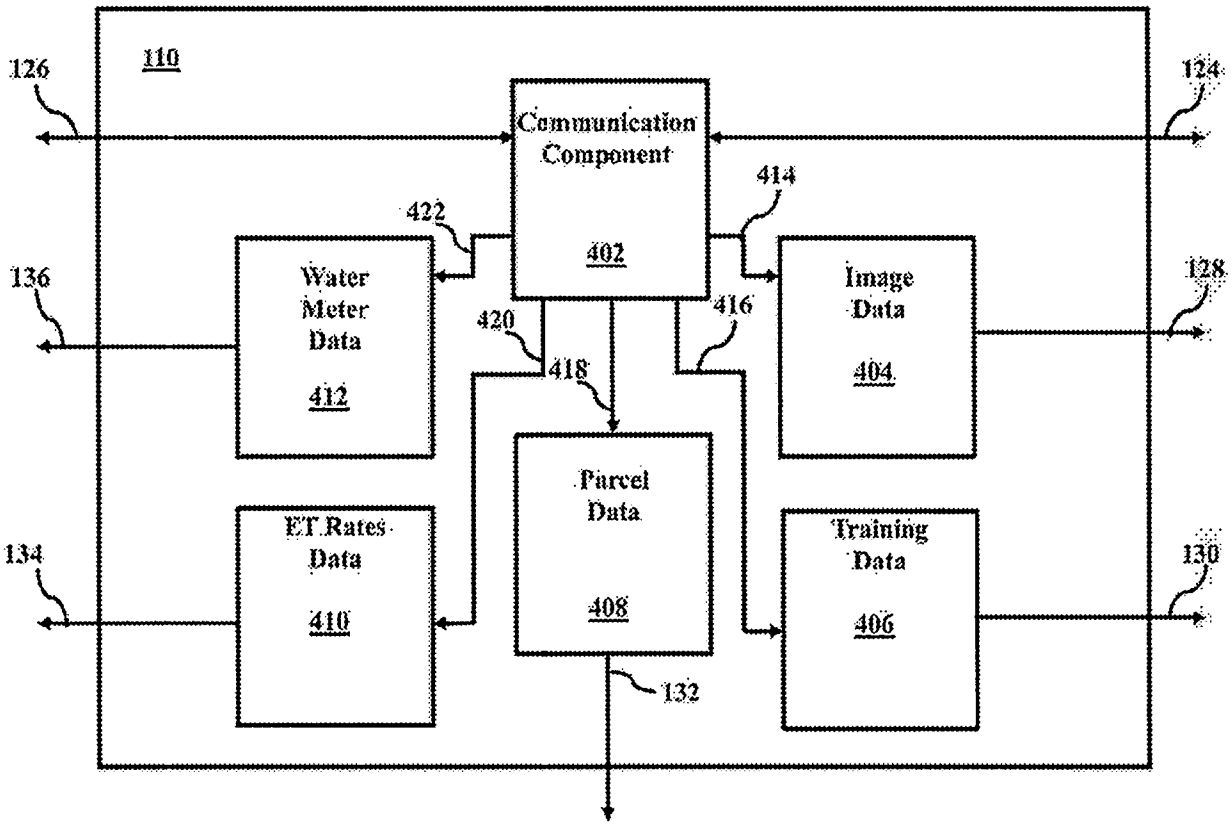
FIG. 4 illustrates an example of the accessing component of FIG. 1

As shown in the figure, method 800 starts (S202), the image data is received (S204) and the vegetation index is generated (S206) in a manner as discussed above with reference to FIGS. 1-2. After the vegetation index is generated, a GLC matrix is generated (S802). For example, as shown in FIG. 7, component 110 provides the received image data to GLC matrix component 706 via communication channel 128. For example, as shown in FIG. 1 accessing component 110 retrieves image data from database 106. As shown in FIG. 3, database 106 provides the image data from image data database 302. As shown in FIG. 4, communication component 402 receives the image data from image data database 302 and provides the image data to image data receiving component 404 via communication channel 414. Returning to FIG. 7, image data receiving component 404 (of accessing component 110) then provides the image data to GLC matrix component 706 via communication channel 128.

GLC matrix component 706 then generates the GLC matrix based on the image data. In an example embodiment, GLX matrix component 706 generates a contrast group result, an orderliness group result and a statistics group result.

Returning to FIG. 8, after the GLC matrix is generated (S802), the classification results are generated (S804). For example, as shown in FIG. 7, accessing component 110 provides the received image data additionally to classification component 708 via communication channel 130. Further, vegetation index component 114 provides the vegetation index to classification component 708 via communication line 142. Still further, GLC matrix component 706 provides the group result to classification component 708 via communication channel 714. With the image data from accessing component 110 and with the vegetation index from vegetation index component 114, classification component 708 classifies each pixel of data as one of many predetermined classes. This will be described in greater detail with reference to FIG. 9.

Figure 9:
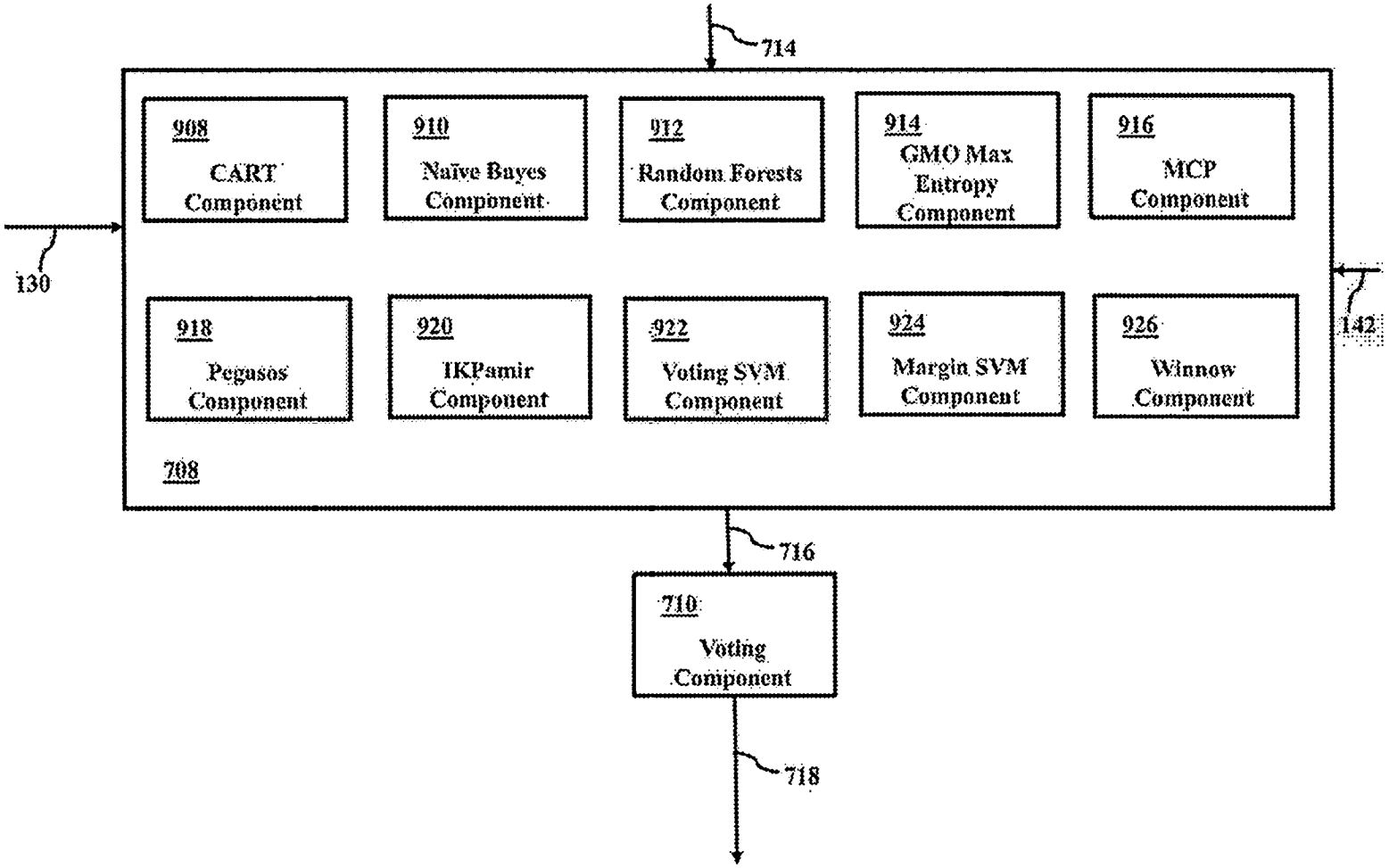
FIG. 9 illustrates an example of the voting component of FIG. 7, in accordance with aspects of the present invention.

FIG. 9 illustrates an example of voting component 706 of FIG. 7, in accordance with aspects of the present invention.

As shown in FIG. 9, voting component 706 includes a plurality of classifying components 902 and a majority voting component 904.

In this example, plurality of classifying components 902 and majority voting component 904 are illustrated as individual devices. However, in some embodiments, plurality of classifying components 902 and majority voting component 904 may be combined as a unitary device. Further, in some embodiments, at least one of classifying components 902 and majority voting component 904 may be implemented as a computer having tangible computer-readable media for carrying or having computer-executable instructions or data structures stored thereon.

Plurality of classifying components 902 includes a CART classifying component 908, a Naïve Bayes classifying component 910, a random forests classifying component 912, a GMO Max Entropy classifying component 914, an MCP classifying component 916, a Pegasos classifying component 918, an IKPamir classifying component 920, a voting SVM classifying component 922, a margin SVM classifying component 924 and a Winnow classifying component 926. It should be noted, that any number of classifying components may be used in accordance with aspects of the present invention, wherein those listed in plurality of classifying components 902 are merely non-limiting examples used for purposes of discussion.

In this example, CART classifying component 908, Naïve Bayes classifying component 910, random forests classifying component 912, GMO Max Entropy classifying component 914, MCP classifying component 916, Pegasos classifying component 918, IKPamir classifying component 920, voting SVM classifying component 922, margin SVM classifying component 924 and Winnow classifying component 926 are illustrated as individual devices. However, in some embodiments, at least two of CART classifying component 908, Naïve Bayes classifying component 910, random forests classifying component 912, GMO Max Entropy classifying component 914, MCP classifying component 916, Pegasos classifying component 918, IKPamir classifying component 920, voting SVM classifying component 922, margin SVM classifying component 924 and Winnow classifying component 926 may be combined as a unitary device. Further, in some embodiments, at least one of CART classifying component 908, Naïve Bayes classifying component 910, random forests classifying component 912, GMO Max Entropy classifying component 914, MCP classifying component 916, Pegasos classifying component 918, IKPamir classifying component 920, voting SVM classifying component 922, margin SVM classifying component 924 and Winnow classifying component 926 may be implemented as a computer having tangible computer-readable media for carrying or having computer-executable instructions or data structures stored thereon.

CART (for Classification and Regression Trees) classifying component 908 uses a decision tree as a predictive model which maps observations about an item to conclusions about the item's target value.

Naïve Bayes classifying component 910 may be any device or system that is able to use a simple probabilistic classifier based on applying Bayes' theorem with strong (naive) independence assumptions between the features. Naive Bayes classifier 910 combines a Bayes classifier model with a decision rule. Other example embodiments may use a Fast Naïve Bayes classifying component, which works on binary or integer weighted features.

Random forests classifying component 912 may be any device or system that is able to employ an ensemble learning method for classification, regression and other tasks, and operates by constructing a multitude of decision trees at training time and outputting the class that is the mode of the classes (classification) or mean prediction (regression) of the individual trees.

GMO Max Entropy classifying component 914 may be any device or system that is able to use a multinomial logistic regression classification method that generalizes logistic regression to multiclass problems, i.e. with more than two possible discrete outcomes. In other words, GMO Max Entropy classifying component 914 uses a model that predicts the probabilities of the different possible outcomes of a categorically distributed dependent variable, given a set of independent variables (which may be real-valued, binary-valued, categorical-valued, etc.).

MCP (for Multi Class Perceptron) classifying component 916 may be any device or system that is a type of linear classifier and as such makes its predictions based on a linear predictor function combining a set of weights with the feature vector. MCP classifying component 916 is used for supervised classification.

Pegasos (for Primal Estimated sub-GrAdient SOlver for SVM) classifying component 918 may be any device or system that is able to employ simple and effective iterative algorithm for solving the optimization problem cast by Support Vector Machines (SVM). The method alternates between stochastic gradient descent steps and projection steps. The method was created by Shalev-Shwartz, Singer, and Srebro.

IKPamir (for Intersection Kernel Support Vector Machines) classifying component 920 may be any device or system that is able to employ a non-linear SVM classifier and uses histogram intersection kernels.

Voting SVM classifying component 922 may be any device or system that is able to employ, for the one-versus-one approach, classification by a max-wins voting strategy. Specifically, every classifier assigns the instance to one of the two classes, then the vote for the assigned class is increased by one vote, and finally the class with the most votes determines the instance classification.

Margin SVM classifying component 924 may be any device or system that is able to construct a hyperplane or set of hyperplanes in a high- or infinite-dimensional space, which can be used for classification, regression, or other tasks. Intuitively, a good separation is achieved by the hyperplane that has the largest distance to the nearest training data point of any class (so-called functional margin), since in general the larger the margin the lower the generalization error of the classifier. Margin SVM classifying component 924 employs a linear SVM model.

Winnow classifying component 926 may be any device or system that is able to use an algorithm similar to the perceptron algorithm. However, MCP classifying component 916 uses an additive weight-update scheme, whereas Winnow classifying component 926 uses a multiplicative scheme that allows it to perform much better when many dimensions are irrelevant (hence its name).

In the example embodiment of FIG. 9, classification component 708 includes 10 distinct classifying components. It should be noted that any number of distinct classifying components equal to or greater than three may be used. The reason that at least three classifying components are used is that the final classification per pixel is based on a majority vote of at least some of the classifying components.

Figure 5:
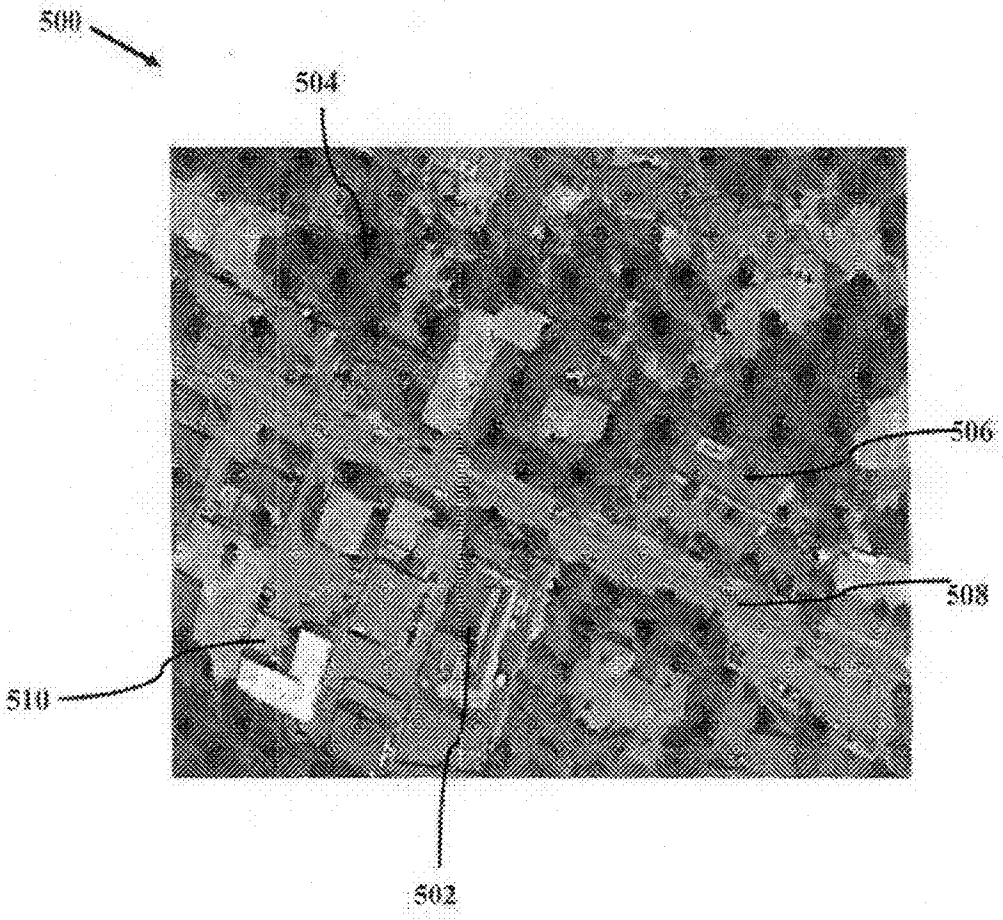
FIG. 5 illustrates a satellite image of a plot of land.
Figure 6:
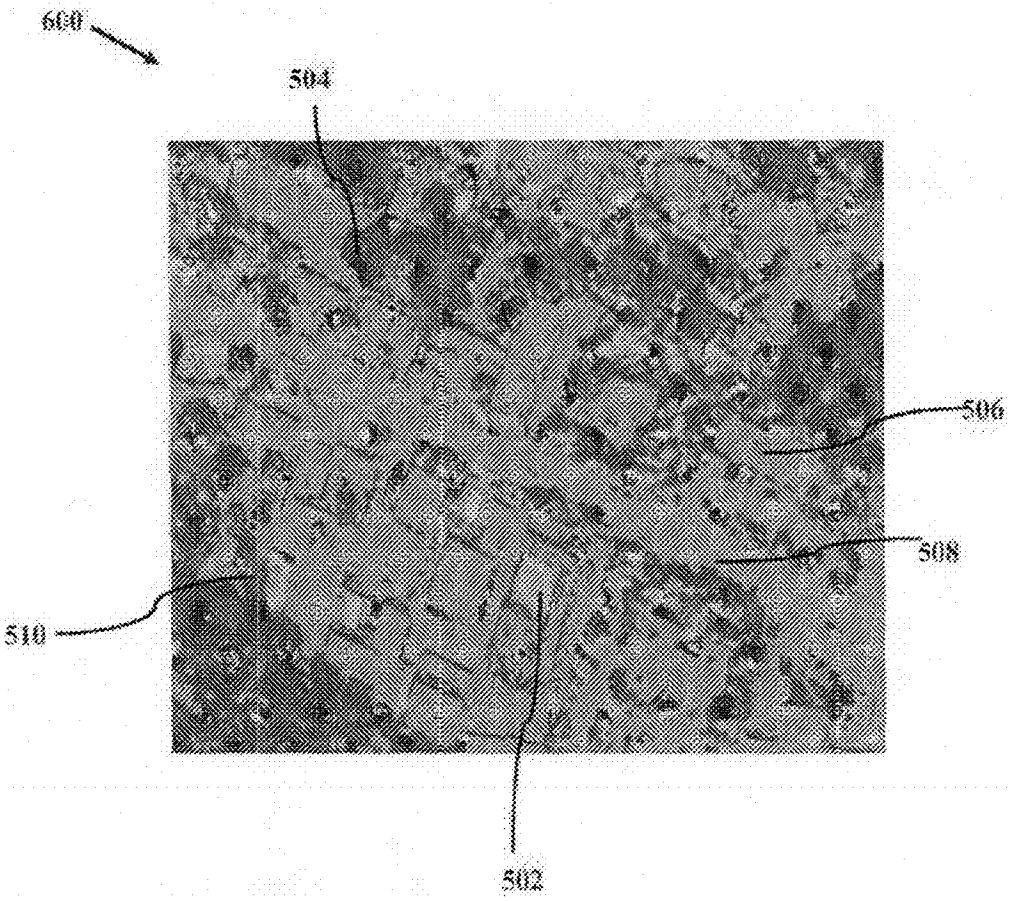
FIG. 6 illustrates a classified image of the plot of land within the satellite image of FIG. 5.

For example, for purposes of discussion, consider classification component 708 of FIG. 9. Further, returning to FIG. 5, let a pixel within image 500 at the location of trees 504, be classified by each of CART classifying component 908, Naïve Bayes classifying component 910, random forests classifying component 912. GMO Max Entropy classifying component 914, MCP classifying component 916, Pegasos classifying component 918, IKPamir classifying component 920, voting SVM classifying component 922, margin SVM classifying component 924 and Winnow classifying component 926. Further, as discussed above, in accordance with aspects of the present invention, each classification is performed with additional reference to the group results generated by GLC matrix component 714 to further reduce the likelihood of an erroneous classification.

As mentioned previously, each classifying method may have specific strengths and weaknesses, wherein some instances of classification are more reliable than others. In this example, for purposes of discussion, presume that CART classifying component 908, Naïve Bayes classifying component 910, random forests classifying component 912, GMO Max Entropy classifying component 914 and MCP classifying component 916 correctly classify the pixel within image 500 at the location of trees 504 as corresponding to a tree. Further, presume that Pegasos classifying component 918, IKPamir classifying component 920, and voting SVM classifying component 922 incorrectly classify the pixel within image 500 at the location of trees 504 as corresponding to artificial turf. Finally, presume that margin SVM classifying component 924 and Winnow classifying component 926 incorrectly classify the pixel within image 500 at the location of trees 504 as corresponding to a road.

In this example, clearly there is not 100% agreement between all the classifying components. However, a majority vote of the classifications will increase likelihood of a correct classification.

As shown in FIG. 9, the classifying components provide their respective classifications to voting component 710 via communication channel 716. In some embodiments, the distinct classifications are provided to voting component 710 in a serial manner. In some embodiments, the distinct classifications are provided to voting component 710 in parallel.

Voting component 710 tallies the classifications for each pixel and generates a final classification for each pixel based on a majority vote of the individual classifications. Using the example discussed above, 5 classifying components classify the pixel within image 500 at the location of trees 504 as corresponding to a tree, 3 classifying components classify the pixel within image 500 at the location of trees 504 as corresponding to artificial turf and 2 classifying components classify the pixel within image 500 at the location of trees 504 as corresponding to a road. In this example, the 5 classifying components that classified the pixel within image 500 at the location of trees 504 as corresponding to a tree are a majority as compared to the 3 classifying components that classified the pixel within image 500 at the location of trees 504 as corresponding to artificial turf and as compared to the 2 classifying components that classified the pixel within image 500 at the location of trees 504 as corresponding to a road. Therefore, voting component 710 would generate the final classification of the pixel within image 500 at the location of trees 504 as corresponding to a tree.

In some embodiments, voting component 710 considers the classifications from all classifying components within classification component 708. In other embodiments, voting component may consider the classifications from less than all classifying components within classification component 708, so long as the number of classifications is equal to or greater than three. In this manner, voting component 710 will avoid the situation where two classifying component each provide different classifications for the same image pixel, so there cannot be a majority.

Returning to FIG. 8, after the classification results are generated (S804), the training data is received (S210) in a manner as discussed above with reference to FIGS. 1-2. After the training data is received, a final classification is generated (S806).

Returning to FIG. 8, after the final classification is generated (S806), the parcel data is received (S214), the land cover by parcel is generated (S216), the ET rates are received (S218), the water budget by parcel is generated (S220), the water meter readings are received (S222) and the Δ is generated (S224) in a manner as discussed above with reference to FIGS. 1-2.

After the Δ is generated (S224), a water use forecast is generated (S808).

Returning to FIG. 8, after the Δ is generated (S224), the water use forecast is generated (S808). For example, as shown in FIG. 7, zonal statistics component 118 provides the land cover classification per county, per town, or even per parcel of land by organizing the land cover classification per county, per town, etc., to regression component 712 via communication line 146. Further, water budget component provides the water budget per parcel to regression component 712 via communication line 148. Finally delta component 122 provides the Δ to regression component 712 via communication line 150.

Regression component 712 uses the land cover classification per parcel, the water budget per parcel and the Δ to generate a water use forecast for each parcel. The land cover classification per parcel is used in combination with collected and derived data that includes representative actual water usage data, parcel information (lot area, dwelling area, number of bathrooms, etc.), demographic and economic data to produce a predictive model of water usage for each parcel. In particular, using previous data and the current data, regression component 712 uses conventional extrapolation methods to predict a water use forecast. With each newly received nowcast, i.e., provided land cover by parcel, the water budget per parcel and the Δ, regression component 712 re-evaluates the extrapolation. In this manner regression component 712 continually generates a water use forecast as an iterative extrapolation method.

The predictive analytics of the water use enables derivation of a relationship between land class and use without the need of the water budget and without using the ET rates. The relationship between land class and use is further enriched by including weather data.

The water use forecast may then be provided to local utilities or government agencies for water management planning. For example, a local agency may enact water saving policies, e.g., preventing watering of lawns or washing cars, as proactive measures in light of a water use forecast that predicts a water shortage. This is a more conservative approach than reactively enacting water saving policies based on a current water shortage, which may have been mitigated or avoided. Conventionally, utilities would look at water use at a global scale and regression is not applied. However, in accordance with aspects of the present invention, water use is evaluated a parcel level scale, and regression is applied to predict future water usage. The Δ may be used to identify high users for the proactive targeting in accordance with aspects of the present invention.

For example, as shown in FIG. 7, zonal statistics component 118 provides the land cover classification per county, per town, or even per parcel of land by organizing the land cover classification per county, per town, etc., to regression component 712 via communication line 146. Further, water budget component provides the water budget per parcel to regression component 712 via communication line 148. Finally delta component 122 provides the Δ to regression component 712 via communication line 150.

Figure 10:
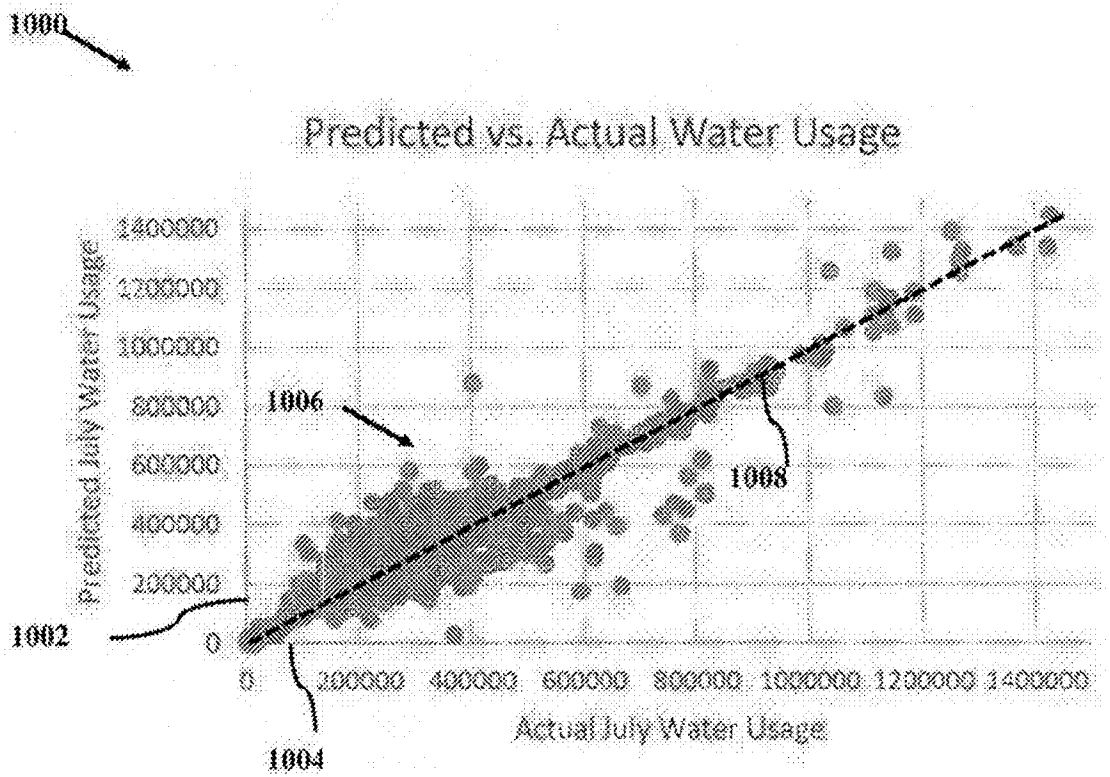
FIG. 10 illustrates a graph of actual water usage verses predicted water usage.

FIG. 10 illustrates a graph 1000 of actual water usage verses predicted water usage.

As shown in the figure, graph 1000 includes a Y-axis 1002, an X-axis 1004 and a plurality of data point 1006. It is clear from graph 1000, that a water use forecast in accordance with aspects of the present invention accurately models actual water usage.

Returning to FIG. 8, after the water use forecast is generated (S808), method 800 stops (S226).

Conventional water managing systems, such as those discussed above with reference to FIGS. 1-2, rely on a single classifying component to classify the image data. Such systems are prone to inaccuracy because no single classifying component is 100% accurate all the time. Further, conventional water managing systems fail to provide a water forecast.

In accordance with aspects of the present invention, a system and method for managing water uses a plurality of classifying components to classify the image data. A majority voting mechanism increases the likelihood for accuracy of classification of the image data. Further, in accordance with aspects of the present invention, a system and method for managing water employs a multivariate regression to provide a water forecast per parcel.

In the drawings and specification, there have been disclosed embodiments of the invention and, although specific terms are employed, they are used in a generic and descriptive sense only and not for purposes of limitation, the scope of the invention being set forth in the following claims.

What is claimed as new and desired to be protected by Letters Patent of the United States is:

1. A device comprising *at least one non-transitory computer-readable media storing a set of instructions for running on a computer system, that when executed cause the computer system to*:

[an image data receiving component operable to] receive multiband image data *of an image* of a geographic region;

[a vegetation index generation component operable to] generate a normalized difference vegetation index based on the received multiband image data *of the image*;

[a grey level co-occurrence matrix generation component operable to] generate a grey level co-occurrence matrix image band based on the received multiband image data *of the image*;

[a first classification component operable] generate a first land cover classification based on the received multiband image data *of the image*, the normalized difference vegetation index and the grey level co-occurrence matrix image band;

[a second classification component operable] generate a second land cover classification based on the received multiband image data *of the image*, the normalized difference vegetation index and the grey level co-occurrence matrix image band;

[a third classification component operable] generate a third land cover classification based on the received multiband image data *of the image*, the normalized difference vegetation index and the grey level co-occurrence matrix image band; [and]

[a voting component operable to] generate a final land cover classification based *on* a majority vote of the first land cover classification, the second land cover classification and the third land cover classification*;*

*generate a model based on the final land cover classification of the geographic region, by:*

*extrapolating a first predicted water usage forecast for the geographic region based at least on the final land cover classification of the geographic region, a water budget, and a difference of an amount of water between the water budget and one or more water meter readings of the geographic region;*

*iteratively extrapolating a second predicted water usage forecast for the geographic region based at least on the final land cover classification, the water budget, and a difference of an amount of water between the water budget and one or more current water readings for the geographic region; and*

*deriving a relationship between the final land cover classification and water use, without using the water budget; and*

*predict a third predicted water usage forecast based on the generated model.*

2. The device of claim 1, wherein [said image data receiving component is operable to] *the at least one non-transitory computer-readable media storing a set of instructions for running on a computer system, that when executed further cause the computer system to:* receive the multiband image data *of the image* of [a] *the* geographic region as an RGB and near infra-red image data of the geographic region.

3. The device of claim 2, wherein the multiband image data *of the image* corresponds to an array of pixels *of the image*, and wherein [said first classification component is operable to] *the at least one non-transitory computer-readable media storing the set of instructions for running on the computer system, that when executed further cause the computer system to:* generate the first land cover classification by classifying each of the pixels of the multiband image data *of the image* as one of the group consisting of grass, a tree, a shrub, a man-made surface, a man-made pool, a natural water body and artificial turf.

4. The device of claim 3, wherein [said first classification component] *generating the first land cover classification based on the received multiband image data of the image, the normalized difference vegetation index and the grey level co-occurrence matrix image band, further* comprises *utilizing* one of the group consisting of a simple classification and regression tree classifier, a naïve Bayes classifier, a random forecasts classifier, a GMO max entropy classifier, an MCP classifier, a Pegasos classifier, an ICPamir classifier, a voting SVM classifier, a margin SVM classifier and a Winnow classifier.

5. The device of claim [4] *1*, [further comprising a parcel data receiving component operable to] *wherein the at least one non-transitory computer-readable media storing the set of instructions for running on the computer system, that when executed further cause the computer system to:* receive parcel data.

6. The device of claim 1, wherein the multiband image data *of the image* corresponds to an array of pixels, and wherein [said first classification component operable] *the at least one non-transitory computer-readable media storing the set of instructions for running on the computer system, that when executed further cause the computer system to:* generate the first land cover classification by classifying each of pixels of the multiband image data *of the image* as one of the group consisting of grass, a tree, a shrub, a man-made surface, a man-made pool, a natural water body and artificial turf.

7. The device of claim 1, wherein [said first classification component comprises] *generating the first land cover classification based on the received multiband image data of the image, the normalized difference vegetation index and the grey level co-occurrence matrix image band, further comprises utilizing* one of the group consisting of a simple classification and regression tree classifier, a naïve Bayes classifier, a random forecasts classifier, a GMO max entropy classifier, a MCP classifier a, a Pegasos classifier, an ICPamir classifier, a voting SVM classifier, a margin SVM classifier and a Winnow classifier.

[8. The device of claim 1, further comprising a regression component operable to extrapolate a predicted water usage based on a history of water usage.]

9. A method, comprising:

receiving[, via an image data receiving component,] multiband image data *of an image* of a geographic region;

generating[, via a vegetation index generation component,] a normalized difference vegetation index based on the received multiband image data *of the image*;

generating[, via a grey level co-occurrence matrix generation component,] a grey level co-occurrence matrix based on the received multiband image data *of the image*;

generating[, via a first classification component,] a first land cover classification based on the received multiband image data *of the image*, the normalized difference vegetation index and the grey level co-occurrence matrix;

generating[, via a second classification component,] a second land cover classification based on the received multiband image data *of the image*, the normalized difference vegetation index and the grey level co-occurrence matrix;

generating[, via a third classification component,] a third land cover classification based on the received multiband image data *of the image*, the normalized difference vegetation index and the grey level co-occurrence matrix;

generating[, via a voting component,] a final land cover classification based *on* a majority vote of the first land cover classification, the second land cover classification and the third land cover classification*;*

*generating a model based on the final land cover classification of the geographic region, by:*

*extrapolating a first predicted water usage forecast for the geographic region based at least on the final land cover classification of the geographic region, a water budget, and a difference of an amount of water between the water budget and one or more water meter readings for the geographic region;*

*iteratively extrapolating a second predicted water usage forecast for the geographic region based at least on the final land cover classification, the water budget, and a difference of an amount of water between the water budget and one or more current water meter readings for the geographic region; and*

*deriving a relationship between the final land cover classification and water use, without using the water budget; and*

*predicting a third predicted water usage forecast based on the generated model.*

10. The method of claim 9, wherein said receiving multiband image data *of the image* of [a] *the* geographic region *further* comprises*:* receiving the multiband image data *of the image* of [a] *the* geographic region as an RGB and near infra-red image data of the geographic region.

11. The method of claim 10, wherein the multiband image data *of the image* corresponds to an array of pixels, and wherein said generating a first land cover classification *further* comprises*:* generating the first land cover classification by classifying each of pixels of the multiband image data *of the image* as one of the group consisting of grass, a tree, a shrub, a man-made surface, a man-made pool, a natural water body and artificial turf.

12. The method of claim 11, wherein said generating a first land cover classification*, further* comprises*:* generating [comprises generating] via one of the group consisting of a simple classification and regression tree classifier, a naïve Bayes classifier, a random forecasts classifier, a GMO max entropy classifier, an MCP classifier, a Pegasos classifier, an ICPamir classifier, a voting SVM classifier, a margin SVM classifier and a Winnow classifier.

13. The method of claim [12] *9*, further comprising*:* receiving[, via a parcel data receiving component,] parcel data.

14. The method of claim 9, wherein the multiband image data *of the image* corresponds to an array of pixels, and wherein said generating a first land cover classification *further* comprises*:* generating the first land cover classification by classifying each of pixels of the multiband image data *of the image* as one of the group consisting of grass, a tree, a shrub, a man-made surface, a man-made pool, a natural water body and artificial turf.

15. The method of claim 9, wherein said generating a first land cover classification *further* comprises*:* generating [comprises generating] via one of the group consisting of a simple classification and regression tree classifier, a naïve Bayes classifier, a random forecasts classifier, a GMO max entropy classifier, an MCP classifier, a Pegasos classifier, an ICPamir classifier, a voting SVM classifier, a margin SVM classifier and a Winnow classifier.

[16. The method of claim 9, further comprising extrapolating, via a regression component, a predicted water usage based on a history of water usage.]

17. [A] *One or more* non-transitory[, tangible,] computer-readable media having computer-readable instructions stored thereon, for use with a computer and being capable of instructing the computer to perform the method comprising:

receiving[, via an image data receiving component,] multiband image data *of an image* of a geographic region;

generating[, via a vegetation index generation component,] a normalized difference vegetation index based on the received multiband image data *of the image*;

generating[, via a grey level co-occurrence matrix generation component,] a grey level co-occurrence matrix based on the received multiband image data *of the image*;

generating[, via a first classification component,] a first land cover classification based on the received multiband image data *of the image*, the normalized difference vegetation index and the grey level co-occurrence matrix;

generating[, via a second classification component,] a second land cover classification based on the received multiband image data *of the image*, the normalized difference vegetation index and the grey level co-occurrence matrix;

generating[, via a third classification component,] a third land cover classification based on the received multiband image data *of the image*, the normalized difference vegetation index and the grey level co-occurrence matrix; [and]

generating[, via a voting component,] a final land cover classification based *on* a majority vote of the first land cover classification, the second land cover classification and the third land cover classification*;*

*generating a model based on the final land cover classification of the geographic region, by:*

*extrapolating a first predicted water usage forecast for the geographic region based at least on the final land cover classification of the geographic region, a water budget, and a difference of an amount of water between the water budget and one or more water meter readings for the geographic region;*

*iteratively extrapolating a second predicted water usage forecast for the geographic region based on at least the final land cover classification, the water budget, and a difference of an amount of water between the water budget and one or more current water meter readings for the geographic region;*

*deriving a relationship between the final land cover classification and water use, without using the water budget; and*

*predicting a third predicted water usage forecast based on the generated model.*

18. The *one or more* non-transitory[, tangible] computer-readable media of claim 17, wherein the computer-readable instructions are capable of instructing the computer to perform the method such that said receiving multiband image data *of the image* of [a] *the* geographic region comprises receiving the multiband image data *of the image* of [a] *the* geographic region as an RGB and near infra-red image data *of the image* of the geographic region.

19. The *one or more* non-transitory[, tangible,] computer-readable media of claim 18, wherein the multiband image data *of the image* corresponds to an array of pixels, and wherein said generating a first land cover classification *further* comprises:

generating the first land cover classification by classifying each of pixels of the multiband image data *of the image* as one of the group consisting of grass, a tree, a shrub, a man-made surface, a man-made pool, a natural water body and artificial turf.

20. The *one or more* non-transitory[, tangible,] computer-readable media of claim 19, wherein the computer-readable instructions are capable of instructing the computer to perform the method such that said generating a first land cover classification *further* comprises generating [comprises generating] via one of the group consisting of a simple classification and regression tree classifier, a naïve Bayes classifier, a random forecasts classifier, a GMO max entropy classifier, an MCP classifier, a Pegasos classifier, an ICPamir classifier, a voting SVM classifier, a margin SVM classifier and a Winnow classifier.

*21. The device of claim 5, wherein the geographic region is determined based on the parcel data.*

*22. A system comprising at least one non-transitory computer-readable media storing instructions for running on a computer, that when executed cause the computer to:*

*receive multiband image data of an image of a geographic region of interest for water management, the multiband image data of the image comprising pixels;*

*classify one or more of the pixels of the multiband image data of the image as one of a group of predetermined land covers by:*

*generating, for each of the pixels of the one or more pixels, a plurality of land cover classifications; and*

*determining, for each of the pixels of the one or more pixels, a final land cover classification from the plurality of land cover classifications;*

*generate a model based on the final land cover classification of the geographic region, by:*

*extrapolating a predicted water usage forecast for the geographic region based at least on the final land cover classification of the geographic region, a water budget, and a difference of an amount of water between the water budget and one or more water meter readings for the geographic region;*

*iteratively extrapolating a second predicted water usage forecast for the geographic region based at least on the final land cover classification, the water budget, and a difference of an amount of water between the water budget and one or more current water meter readings for the geographic region;*

*deriving a relationship between the final land cover classification and water use, without using the water budget; and*

*predict a third predicted water usage forecast based on the generated model.*

*23. The system of claim 22, wherein determining, for each of the pixels of the one or more pixels, the final land cover classification from the plurality of land cover classifications is based on a majority vote of the plurality of land cover classifications.*

*24. The system of claim 22, wherein determining, for each of the pixels of the one or more pixels, the final land cover classification from the plurality of land cover classifications, further comprises:*

*receiving image training data indicative of an analysis of imagery depicting vegetation and one or more man-made surface.*

*25. The system of claim 22, wherein classifying one or more of the pixels of the multiband image data of the image as one of the group of predetermined land covers, further comprises:*

*utilizing image training data indicative of an analysis of imagery depicting vegetation or one or more man-made surface.*

*26. The method of claim 22, wherein iteratively extrapolating, with the system, a second predicted water usage forecast is further based on one or more of: demographic data, economic data, and parcel information;*

*wherein the parcel information comprises one or more of: an area of the geographic region, an area of a dwelling located within the geographic region, and number of bathrooms located within the dwelling.*

*27. A method, comprising:*

*receiving, with one or more computers, multiband image data of an image of a geographic region, the multiband image data of the image having pixels;*

*receiving, with the one or more computers, image training data indicative of an analysis of imagery depicting vegetation and one or more man-made surface;*

*classifying, with the one or more computers, one or more of the pixels of the multiband image data of the image as one of a group of predetermined land covers by:*

*generating, with the one or more computers, a plurality of land cover classifications, for each of the pixels of the one or more pixels, based on analyzing the received multiband image data of the image with the image training data; and*

*generating, with the one or more computers, a final land cover classification for the geographic region based on the plurality of land cover classifications;*

*generating a model based on the final land cover classification of the geographic region, by:*

*extrapolating, with the one or more computers, a first predicted water usage forecast for the geographic region based at least on the final land cover classification, a water budget, and a difference of an amount of water between the water budget and one or more water meter readings for the geographic region;*

*iteratively extrapolating, with the one or more computers, a second predicted water usage forecast for the geographic region based at least on the final land cover classification, the water budget, and a difference of an amount of water between the water budget and one or more current water meter readings for the geographic region;*

*deriving, with the one or more computers, a relationship between the final land cover classification and water use, without using the water budget; and*

*predicting, with the one or more computers, a third predicted water usage forecast based on the generated model.*

*28. The method of claim 27, wherein generating, with the one or more computers, the final land cover classification is based on a majority vote of the plurality of land cover classifications.*

*29. The method of claim 27, wherein iteratively extrapolating, with the one or more computers, the second predicted water usage forecast is further based on one or more of: demographic data, economic data, and parcel information;*

*wherein the parcel information comprises one or more of: an area of the geographic region, an area of a dwelling located within the geographic region, and number of bathrooms located within the dwelling located within the geographic region.*

* * * * *